United States Patent [19]

Crucil et al.

[11] Patent Number: 4,797,224

[45] Date of Patent: Jan. 10, 1989

[54] BRANCHED ALKYL ACRYLAMIDE TYPES OF POLYMER-ZINC CORROSION INHIBITOR

[75] Inventors: Guy A. Crucil, Bloomingdale; Laura J. Blaser, Western Springs, both of Ill.

[73] Assignee: Nalco Chemical Company, Naperville, Ill.

[21] Appl. No.: 92,008

[22] Filed: Sep. 2, 1987

Related U.S. Application Data

[62] Division of Ser. No. 848,014, Apr. 3, 1986, abandoned.

[51] Int. Cl.$^4$ ................................. C02F 5/14
[52] U.S. Cl. ..................... 252/181; 210/697; 210/698; 210/699; 210/700; 210/701; 252/180; 422/16; 422/17; 422/18; 422/19
[58] Field of Search ............... 252/180, 181; 210/697–701; 422/16–19

[56] References Cited

U.S. PATENT DOCUMENTS

| | | | |
|---|---|---|---|
| 4,209,398 | 6/1980 | Ii et al. | 252/181 |
| 4,303,568 | 12/1981 | May et al. | 252/181 |
| 4,324,684 | 4/1982 | Geiger et al. | 252/181 |
| 4,387,027 | 6/1983 | May et al. | 252/181 |
| 4,411,865 | 10/1983 | Geiger et al. | 422/16 |
| 4,502,978 | 3/1985 | Romberger et al. | 252/181 |
| 4,529,572 | 7/1985 | Romberger et al. | 422/17 |
| 4,566,973 | 1/1986 | Masler, III et al. | 252/180 |

OTHER PUBLICATIONS

"Small-Scale Short-Term Methods of Evaluating Cooling Water Treatments . . . Are They Worthwhile", International Water Conference, Pittsburgh, PA, Nov. 4–6, 1975, 36th Annual Meeting.

*Primary Examiner*—Robert A. Wax
*Attorney, Agent, or Firm*—John G. Premo; Donald G. Epple; Anthony L. Cupoli

[57] ABSTRACT

Water-soluble zinc:polymer complexes of nitrogen-containing polymers are useful in preventing corrosion in aqueous recirculating systems operating within the pH range of 7.0–9.5, when combined with orthophosphate ion sources.

5 Claims, No Drawings

BRANCHED ALKYL ACRYLAMIDE TYPES OF POLYMER-ZINC CORROSION INHIBITOR

This application is a division of application Ser. No. 848,014, filed 4-3-86, now abandoned.

THE INVENTION

The invention is a method for preventing corrosion and scale formation on metals exposed to recirculating industrial waters which comprises adding to said waters an effective amount of a water-soluble zinc salt in combination with a water-soluble zinc N-alkylated complexing amide polymer and an orthophosphate ion source, wherein:

(a) the weight ratio of zinc to zinc complexing polymer ranges between about 1:1 to about 1:25;

(b) the weight ratio of zinc to orthophosphate ion ranges between about 2:1 to about 1:10; and (c) the N-alkylated zinc complexing amide polymer has a weight average molecular weight ranging between about 500 to 50,000 and is chosen from the group consisting of water soluble polymers, copolymers and/or terpolymers containing at least two (2) mole percent, preferably at least ten (10) mole percent of an N-alkylated acrylamide monomer, wherein the nitrogen substituted alkyl group contains from 2 to 12 carbon atoms and wherein the nitrogen substituted alkyl group may be linear or branched.

In a preferred mode, the N-alkylated zinc complexing amide polymer is first combined with a zinc salt to form a zinc-amide polymer complex which is added to the corrosive waters containing orthophosphate ion in sufficient amounts to provide between 0.5-5 ppm of zinc and between 0.5-125 ppm of the polymer. Another preferred mode is when the recirculating waters have added to them, either simultaneously or separately, in a single formulation or separate formulations, all three key ingredients described above in the ratios described above, and so as to achieve the concentration mentioned above for zinc and N-alkylated complexing amide-containing polymer.

As will be shown hereinafter, the invention's corrosion inhibiting effects are far greater than the effects achieved when the individual components, e.g. the complexing polymer, the zinc, or the orthophosphate, are added separately or in combinations not including all three ingredients, to the system being inhibited against corrosion and scale formation.

THE ZINC COMPLEXING POLYMER

These N-alkylated amide-containing complexing polymers are prepared by conventional solution polymerization techniques using free radical catalysts. See, for example, the polymerization technique in U.S. Pat. No. 4,566,973, which patent, in its entirety, is incorporated herein by reference. The polymers preferably contain other monomers such as acrylamide, acrylic acid, methacrylamide, methacrylic acid, maleic acid or anhydride, itaconic acid, methyl or ethyl acrylate, and mixtures thereof. The preferred polymer is a copolymer containing at least two (2) mole percent of an N-alkylated acrylamide monomer, preferably at least ten (10) mole percent of this N-alkylated acrylamide monomer. A preferred copolymer contains, in addition to the N-alkylated substituted acrylamide, either acrylic acid or methacrylic acid monomers, or combinations thereof, and wherein the (meth)acrylic acid(s) are between 20-80 percent by weight of the polymer. Most preferably, our complexing polymers are terpolymers containing from 20-80 percent by weight of acrylic acid, 10-40 weight percent methacrylic acid, and at least 2 weight percent of a branched alkyl substituted N-alkylated acrylamide monomer, wherein the N-alkylation is from branched alkyl groups containing from 3-12 carbon atoms, and wherein the most preferred of the N-alkylated acrylamide monomers is N-tertiary butyl-acrylamide represented by:

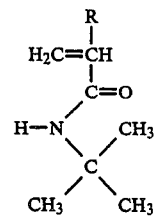

Using known polymerization methods, the molecular weight of the N-alkyl substituted amide polymers should be maintained within the range of about 500-50,000. A preferred copolymer of the invention would have a molecular weight range of about 2,500-25,000. The most preferred molecular weight for the N-t-butyl-acrylamide containing terpolymers would be about 5,000-20,000.

The most preferred terpolymer is one containing from 60±10 weight percent acrylic acid, 20±5 weight percent methacrylic acid, and from 20±5 weight percent of N-t-butyl-acrylamide, which has a molecular weight of from 5,000-20,000.

The Zn-complexing polymers are conveniently polymerized to provide a polymer solution having a concentration of between 20-80 percent by using procedures as described in U.S. Pat. No. 4,566,973, previously incorporated herein by reference. This solution may be diluted to any desired concentration either prior to or after the zinc complex of the copolymer is formed.

The polymers may also be used in combination one with another, that is, a copolymer of acrylic acid and N-methyl acrylamide may be combined with a terpolymer of 60:20:20 weight ratio acrylic acid:methacrylic acid:N-t-butyl acrylamide to achieve zinc complexation necessary to accomplish the results necessary to beneficially act as a corrosin inhibitor and/or scale prevention formulation in industrial recirculating waters. In addition, the N-alkylated amide polymers may be combined with other water-soluble polymers known to form soluble zinc complexes at high pH and alkalinity in industrial waters.

THE FORMATION OF THE COPOLYMER ZINC COMPLEX

The zinc complex of the N-alkylated amide containing complexing polymers with zinc is simply prepared. A water-soluble zinc salt such as zinc chloride, zinc sulfate, or zinc acetate is added to the preformed polymer solution to provide a polymer:zinc ion weight ratio within the range of about 1:1 to 25:1. Preferred weight ratios of polymer to zinc are at least 2:1. The aqueous solution of zinc:N-alkylated amide containing polymer complex may also be synthesized by adding N-alkylated amide polymer solutions to water solutions of zinc salts. To demonstrate this stabilization, the following table is presented:

TABLE I

Comparison of Various Polymers as Zinc Stabilizers
TEMPERATURE = 110° F. FOR 24 HOURS, pH = 9, 150 mg/l Ca(CaCO$_3$),
100 mg/l Mg(CaCO$_3$), Total Zn = 5 mg/l,
TREATMENT RATIO = WEIGHT RATIO OF POLYMER ACTIVES TO ZINC
PERCENT ZINC STABILIZATION (SOLUBLE ZINC IN mg/l)

| | | | TREATMENT RATIO | | | |
|---|---|---|---|---|---|---|
| Composition | Mole % | Mw | 1:1 | 2:1 | 3:1 | BLANK |
| 1. AA/EA | 85/15 | 3,270 aq | 0(0.8) | 79(4.1) | 83(4.3) | (0.8) |
| 2. SS/MALEIC ACID | 75/25 | 19,000 aq | 27(2.1) | 39(2.6) | 44(2.8) | (1.0) |
| 3. PAA | 100 | 2,500* | 0(0.4) | 0(0.6) | 0(0.4) | (0.5) |
| 4. MODIFIED PAA | 100 | 2,500* | 0(0.7) | 0(0.4) | 0(0.5) | (0.5) |
| 5. PCA, Na SALT | 100 | 376 | 0(0.6) | 0(0.6) | 0(0.7) | (0.6) |
| 6. AA/t-BuAm | 88/12 | 9,280 aq | 51(2.9) | 72(3.8) | 74(3.9) | (0.8) |
| 7. AA/EA/t-BuAm | 86/8/6 | 8,900 aq | 13(1.1) | 78(4.0) | 82(4.2) | (0.5) |
| 8. AA/Am/t-BuAm | 84/11/6 | 9,400 aq | 11(1.0) | 76(3.9) | 80(4.1) | (0.5) |
| 9. AA/MAA/t-BuAm | 68/19/13 | 15,600 aq | 13(1.1) | 80(4.1) | 71(3.7) | (0.5) |

*The method of determination of molecular weight involved gel permeation chromatography using a salt buffer solution as eluent. These values are not directly comparable to others which used water (GPC) as eluent.
MAA = methacrylic acid
AA = acrylic acid
EA = ethylacrylate
SS = sulfonated styrene
PAA = Polyacrylic acid homopolymer
t-BuAm = N—tertiary butyl acrylamide
Am = Acrylamide
PCA — Phosphinocarboxylic acid As previously indicated, copolymers and/or terpolymers with acrylic acid/methacrylic acid are preferred and the aqueous solution of these copolymers from which the copolymer zinc complex is prepared may have an acid pH range, however, the pH of the formulations prepared with zinc salts, complexing polymer and orthophosphate ions may range between about 2.0 to about 13.5. At the higher pH values, higher polymer:zinc ratios are required to maintain stability. Above pH 7.0, the preferred polymer:zinc ratios are between about 3:1 to 20:1.

ORTHOPHOSPHATE

A desirable feature of the invention to prohibit corrosion comprises utilizing the N-alkylated amide polymer/zinc complexes in combination with an effective amount of a water soluble orthophosphate compound. The orthophosphate may be utilized by incorporating phosphoric acid into the compositions of the inventions or the orthophosphate may be separately added to the recirculating industrial waters to be treated to prevent corrosion and scale build-up. The orthophosphate, when added to zinc-polymer compositions, should be of such type and amount not to destablize the complexes. When separately added to the recirculating industrial waters to be inhibited, the orthophosphate may be selected from inorganic orthophosphates such as phosphoric acid or water-soluble metallic or ammonium salts thereof. The combination of zinc N-alkylated amide polymer complex with a source of orthophosphate ions allows some recirculating cooling waters, or for that matter once-through cooling waters, to operate effectively to achieve their cooling requirements without corrosion or scale build-up and without the need for any additional ingredients to control the pH of the cooling waters.

THE TREATMENT OF INDUSTRIAL RECIRCULATING WATERS

The industrial recirculating waters to be treated with the combination of N-alkylated amide containing polymer:zinc complex and orthophosphate as described above include industrial cooling waters, industrial heating waters, either used on a recirculating basis or used on a once-through basis. Although we use the term industrial recirculating waters, it is common in certain utility industries to use water for cooling purposes on a once-through basis, i.e., water is taken into a facility requiring cooling and discharged to the environment after one pass through the system. It is our intent that the term industrial recirculating waters mean not only those waters which are undergoing concentration phenomenon because of their recirculating nature through a cooling tower, but also those waters used on a once-through basis. To be most effective, the zinc:polymer complex in combination with orthophosphate must be used in waters having a pH ranging between about 7.0–9.5. These industrial waters also normally have calcium hardness ranging between 20–1,000 ppm as calcium carbonate. In addition, these waters normally have a magnesium hardness ranging between about 20–1,000 ppm, as measured as calcium carbonate, and have an M-alkalinity ranging between about 50–1,000 ppm, as measured as calcium carbonate, and a conductivity ranging between about 250–10,000 micromhos. The temperatures of these industrial waters normally range between about 70° F. to about 150° F. after they have been exposed to the equipment requiring cooling. A normal operating temperature range would be between about 100°–140° F.

The combination of the above three ingredients, zinc, complexing polymer, and orthophosphate, is added to the industrial recirculating waters to achieve an effective amount of this combination for the purpose of inhibiting corrosion and inhibiting the formation of scale on various metal surfaces exposed to the industrial waters being treated. An effective amount of this zinc:polymer:orthophosphate formulation normally ranges between about 0.5–5.0 ppm total zinc wherein the zinc:polymer weight ratio contained in the industrial water ranges between about 1:1 to about 1:25, preferably about 1:2 to 1:20, and the zinc:orthophosphate weight ratio ranges between about 2:1 to about 1:10. Preferably, to be effective, the zinc concentration ranges between about 1.0 to about 3.0 ppm zinc in the recirculating waters and the weight ratio of zinc to polymer ranges between about 1:2 to about 1:20. The zinc:orthophosphate weight ratio preferably ranges between about 1:1 to about 1:5, and is most preferably about 1:4.

The combination of zinc:polymer complex and orthophosphate may also be used in conjunction with other materials commonly used in recirculating waters. For example, the combination of zinc:polymer complex plus orthophosphate may also include such ingredients as tolyltriazole, 1-hydroxy-ethylidene-1,1-diphosphonic acid, (hereinafter HEDP), and other complex organophosphonates such as PBTC[1]. When the zinc:polymer complex combined with orthophosphate contains other ingredients, corrosion inhibition can be particularly improved while deposit formation can be inhibited at least equally as well, and often can be improved in these recirculating industrial waters.

[1] PBTC is an abbreviation for 2-phosphonobutane-1,2,4 tricarboxylic acid

To demonstrate the benefits of this invention, the following examples are presented:

EXAMPLE 1

A pilot cooling tower system described in a paper presented at the 38th Annual Meeting of the International Water Conference which was held in Pittsburgh, Pa. on Nov. 4–6, 1975, and which paper is incorporated herein by reference, was used to test combinations of various complexing polymers, zinc salts, orthophosphate, and other ingredients. The water tested had a pH ranging between 8.0–9.0, a calcium hardness of about 300–400 ppm as calcium carbonate, a magnesium hardness of about 150–250 ppm as calcium carbonate, and M-alkalinity ranging between about 100–300 ppm as calcium carbonate. The conductivity ranged between about 3,800–4,200 micromhos. In addition these recirculating waters contained approximately 1,000 ppm of sulfate ion, about 250 ppm chloride ion, and about 600 ppm sodium ion.

To these waters were added various active levels of the ingredients listed in Table II. Table II presents the complexing polymers, zinc, as calculated as zinc ion from the addition of a water-soluble zinc salt, orthophosphate as calculated by the orthophosphate anion from the addition of a orthophosphate anion source, and other ingredients listed therein. Each of these ingredients were present at the concentration of actives in ppm which are presented in Table II. At the bottom of Table II the corrosion results on mild steel heat transfer tubes undergoing a heat transfer coefficient of about 500–1,500 BTU/ft2/hour, are presented in terms of the mils per year (hereinafter mpy) of mild steel lost under these conditions. Also, the deposits formed, as calculated as milligrams of deposit per day deposited on 0.2 square feet of metal surface, are also presented.

In the first column, it is noted that a formulation containing 6 ppm of an active polymer of acrylic acid and ethylacrylate and having a molecular weight within the preferred molecular weight range in combination with 2 ppm of a homopolymer of acrylic acid, also having a molecular weight within the preferred molecular weight range, is combined with 3 ppm of zinc. This combination is tested in the recirculating waters described above in the pilot cooling tower for sufficient time to derive reproducible results. The corrosion results indicates that the mild steel heat transfer tube would have a lost metal at a rate of about 39 mils per year. This is an unacceptably high corrosion rate.

Simultaneously, the deposit results on these heat transfer tubes indicates that using the above combination would allow formation of 615 milligrams per day of deposits on a metal surface having an area of about 0.2 square feet. This too is an unacceptable deposition rate.

TABLE II

| | PPM Actives | | | | | | | | | | | | |
|---|---|---|---|---|---|---|---|---|---|---|---|---|---|
| Acrylic Acid/Ethylacrylate (80/20) | 6 | 6.25 | 6 | 6 | | | 6 | | 4 | 12 | 6.25 | 24 | 12 |
| Acrylic Acid | 2 | 0.75 | | | | 6 | 2 | | 4 | 12 | .75 | 24 | 12 |
| Acrylic Acid/Methyacrylate (80/20) | | | | | 6 | | | | | | | | |
| Zinc | 3 | 3 | 3 | 1 | 1 | 1 | | 1 | 1 | 1 | 3 | 1 | 1 |
| Orthophosphate | | | | 4 | 4 | 4 | 4 | 4 | 4 | 4 | 2 | 4 | 5 |
| HEDP[1] | | 3 | | | | | | | | | 2.4 | | |
| PBTC[2] | | | 3 | | | | | | | | | | |
| TT[3] | | | | | | | | | | | | | 2.2 |
| (Mild Steel) Corrosion Results (Heat Transfer Tubes - Weight Loss) | 39 mpy | 59 | 62 | 4.7 | 7.1 | 3 | 11.8 | 6.1 | 3.3 | 1.7 | 6.7 | 6.8 | 3.0 |
| (Mild Steel) Deposit Results Mg/Day on 0.2 ft2 Surface Area | 615 | 735 | 851 | 60.3 | 99.5 | 52.5 | 145 | 102.4 | 51.9 | 23.2 | 107.6 | 76.8 | 50. |

[1] HEDP = 1-hydroxyethylidene-1,1-diphosphonic acid
[2] PBTC = 2-Phosphonobutane-1,2,4 tricarboxylic acid
[3] TT = Tolyltriazole Column 2 of Table II uses a combination of complexing polymers, zinc, and a common organophosphate material commonly formulated to allegedly prevent corrosion and scale formation. As can be seen, the same waters, under the same conditions, obtained a corrosion result of 59 mils per year and deposit rate of 735 milligrams per day on a surface area of approximately 0.2 square feet. Again these rates are unacceptable.

Column 3 shown a combination of a complexing polymer with zinc and then combined with 3 ppm of another common phosphonate type inhibitor, PBTC. Again the corrosion rates and deposit rates are unacceptable at 62 mpy and 851 milligrams per day on a 0.2 square foot surface area.

The rest of Table II shows various combinations of complexing polymer with zinc and/or orthophosphate. In addition, the Table also contains results of combinations of complexing polymer, zinc, and orthophosphate which additionally contains the organophosphate, phosphonate, and/or tolyltriazole components. As can be seen, all of the results using the combination of complexing polymer, zinc, and orthophosphate show much improved corrosion inhibition ranging from 1.7 mils per year up to 7.1 mils per year and much improved deposit control results ranging from about 23 milligrams per day to about 99.5 milligrams per day on the 0.2 square foot surface area.

Some of the columns in this Table show only combinations of polymer and orthophosphate or only combinations of orthophosphate and zinc. These results indicate that though improvements can be made over the zinc:phosphonate combination, when the triple combination of an acrylate/acrylic acid:zinc:phosphate is used, surprisingly good results are obtained. This is the subject of a co-pending patent application, Ser. No. 748,518, filed June 25, 1985, which is incorporated herein by reference.

To demonstrate the improvements obtained with the nitrogen-containing zinc complexing polymers of our invention, the following table (Table III) is presented:

TABLE III

| PPM (Actives), Basis Water With M Alkalinity = 150 | | | | | | | | | |
|---|---|---|---|---|---|---|---|---|---|
| Zinc | 1.0 | 0.5 | 0.5 | 1 | 1.0 | 1* | 0.5 | 1 | |
| Orthophosphate | 4.0 | 3 | 3.0 | 3 | 4.0 | 3 | 3 | 3 | 3 |
| HEDP | | 3 | 4.2 | | | | 4.2 | | 4.2 |
| PBTC | 2.0 | 2 | | 2 | | 2 | 2 | 2 | 2 |
| TT | 2.0 | 2.25 | 2.25 | 2 | | 2 | 2.25 | 2 | 2 |
| N—alkyl sub.-acrylamide polymer | 7.5 | 5 | 7.5 | 7.5 | | 7.5 | 7.5 | 7.5 | 7.5 |
| Corrosion Results (M.S.) | 1.8 | 1.4 | 2.2 | 3.3 | 6.1 | 1.7 | 1.8 | 1.4 | 3.5 |
| Deposit Results (M.S.) | 20.1 | 43.2 | 56.2 | 46.7 | 102.4 | 26.3 | 29.1 | 22.6 | 48.3 |

*M alkalinity = 380

HEDP, PBTC and TT have the same meanings as in Table II. The N-alkyl substituted acrylamide polymer is a terpolymer containing on a weight ratio basis, acrylic acid; methacrylic acid; N-t-butyl acrylamide at 60:20:20 weight ratios. This polymer, as well as similar nitrogen containing polymers is disclosed in U.S. Pat. No. 4,566,973, issued Jan. 28, 1986, which is incorporated herein by reference. However, U.S. Pat. No. 4,566,973 does not teach zinc stabilization using the polymers contained and disclosed therein.

Having described our invention, we claim:

1. A composition for preventing corrosion and scale in aqueous recirculating systems which consists essentially of an aqueous solution having a pH within the range 2.0–13.5 and containing at least 2 ppm of 2-phosphono-butane-1,2,4 - tricarboxylic acid, or its water-soluble salts and containing a water-soluble zinc-polymer complex having a zinc:polymer weight ratio with the range 1:3 to about 1:20 and having also dissolved therein a water-soluble orthophosphate ion source that the zinc:orthophosphate ion weight ratio is between about 1:1 to about 1:5, and wherein the polymer is a nitrogen-containing zinc-complexing polymer having a molecular weight between about 2500–25,000 and is chosen from the group consisting of water-soluble terpolymers containing from 20–80 percent by weight acrylic acid, or its water-soluble salts, 10–40 weight percent methacrylic acid, or its water-soluble salts, and at least two (2) weight percent of an N-alkylated acrylamide monomer, wherein the nitrogen substituted alkyl group contains from 3–12 carbon atoms and wherein the nitrogen substituted alkyl group is branched.

2. The composition of claim 1 wherein the nitrogen containing zinc complexing polymer contains at least ten (10) weight percent of a N-alkylated acrylamide monomer, at least thirty (30) weight percent acrylic acid or its salts, and at least twenty (20) weight percent methacrylic acid or its salts, and wherein the pH ranges from about 4.0–11.0.

3. The composition of claim 1 wherein the nitrogen containing zinc complexing polymer contains at least thirty (30) weight percent acrylic acid; at least twenty (20) weight percent methacrylic acid; and a least ten (10) weight percent N-t-butyl-acrylamide, and the molecular weight of the zinc complexing polymer ranges between about 2,500–25,000.

4. The composition of claim 2 wherein the water-soluble zinc-polymer complex has a zinc:polymer weight ratio within the range 1:1 to 1:8 and the zinc:orthphosphate ion weight ratio is between 1:1 and 1:5, and wherein the zinc-complexing polymer has a molecular weight ranging between about 5,000–20,000, and contains at least 10 weight percent N-tertiary butyl acrylamide, and the aqueous solution has a pH within the range of about 3.0–9.0.

5. The composition of claim 1 which additionally contains at least one of the ingredients chosen from the group consisting of 1-hydroxyethylidene-1,1 diphosphonic acid, tolyltriazole, polyphosphates, homopolymers of acrylic acid, copolymers of acrylic acid with acrylamide, methacrylamides, methacrylic acid, itaconic acid, methyl acrylate, ethyl acrylate, and mixtures thereof, and wherein the homopolymers and copolymers of acrylic acid have a molecular weight ranging between about 1000–20,000.

* * * * *